United States Patent
Ishiguro et al.

(10) Patent No.: US 7,326,462 B2
(45) Date of Patent: Feb. 5, 2008

(54) ACRYLIC PRESSURE-SENSITIVE ADHESIVE COMPOSITION AND PRESSURE-SENSITIVE ADHESIVE TAPE

(75) Inventors: Shigeki Ishiguro, Ibaraki (JP); Minoru Kanatani, Ibaraki (JP); Shinsuke Ikishima, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 68 days.

(21) Appl. No.: 11/166,475

(22) Filed: Jun. 24, 2005

(65) Prior Publication Data

US 2005/0276973 A1   Dec. 15, 2005

Related U.S. Application Data

(62) Division of application No. 10/377,234, filed on Feb. 27, 2003, now Pat. No. 7,109,266.

(30) Foreign Application Priority Data

Feb. 27, 2002 (JP) ............... 2002/51840
Jul. 12, 2002 (JP) ............... 2002/204898

(51) Int. Cl.
C09J 7/02 (2006.01)
B32B 7/12 (2006.01)
(52) U.S. Cl. ............... 428/355 AC; 428/343; 428/354; 524/474; 524/490; 526/931
(58) Field of Classification Search ......... 428/355 AC, 428/343, 354; 524/474, 490; 526/931
See application file for complete search history.

(56) References Cited

U.S. PATENT DOCUMENTS

| | | | |
|---|---|---|---|
| 3,677,985 A | 7/1972 | Sirota et al. | |
| 3,936,571 A | 2/1976 | Van Hoof et al. | |
| 7,109,266 B2* | 9/2006 | Ishiguro et al. | 524/474 |
| 2001/0031355 A1 | 10/2001 | Nakagawa et al. | |
| 2003/0175512 A1 | 9/2003 | Ishiguro et al. | |

FOREIGN PATENT DOCUMENTS

| | | |
|---|---|---|
| JP | 01-221474 | 9/1989 |
| JP | 03-281587 | 12/1991 |
| JP | 05-047249 | 2/1993 |

(Continued)

Primary Examiner—Daniel Zirker
(74) Attorney, Agent, or Firm—Leydig, Voit & Mayer, Ltd.

(57) ABSTRACT

The present invention relates to an acrylic pressure-sensitive adhesive composition containing an acrylic polymer and a tackifier obtained by acid modification of a tackifier resin inherently free of an acid component; a pressure-sensitive adhesive tape including a substrate made of a film comprising an olefin polymer or a thermoplastic resin containing a carbonyl oxygen atom in the molecular skeleton, and the acrylic pressure-sensitive adhesive composition on at least one surface of the substrate, and the like. The invention provides an acrylic pressure-sensitive adhesive composition having high adhesive strength (particularly initial adhesive strength) to an adherend having lower polarity, such as an olefin polymer heretofore been considered poorly adhesive, wherein degradation of the adhesive strength after heating and preservation has been suppressed, as well as a pressure-sensitive adhesive tape comprising the composition. The pressure-sensitive adhesive tape of the present invention is also useful for binding.

11 Claims, 2 Drawing Sheets

FOREIGN PATENT DOCUMENTS

| | | |
|---|---|---|
| JP | 05-194915 | 8/1993 |
| JP | 05-320604 | 12/1993 |
| JP | 06-033033 | 2/1994 |
| JP | 06-346037 | 12/1994 |
| JP | 08-209078 | 8/1996 |
| JP | 08-333425 | 12/1996 |
| JP | 10-273634 | 10/1998 |
| JP | 2000-169799 | 6/2000 |
| JP | 2001-253954 A | 9/2001 |
| JP | 2001-354925 A | 12/2001 |
| WO | WO 92/01761 A1 | 2/1992 |
| WO | WO 96/05248 A1 | 2/1996 |

* cited by examiner

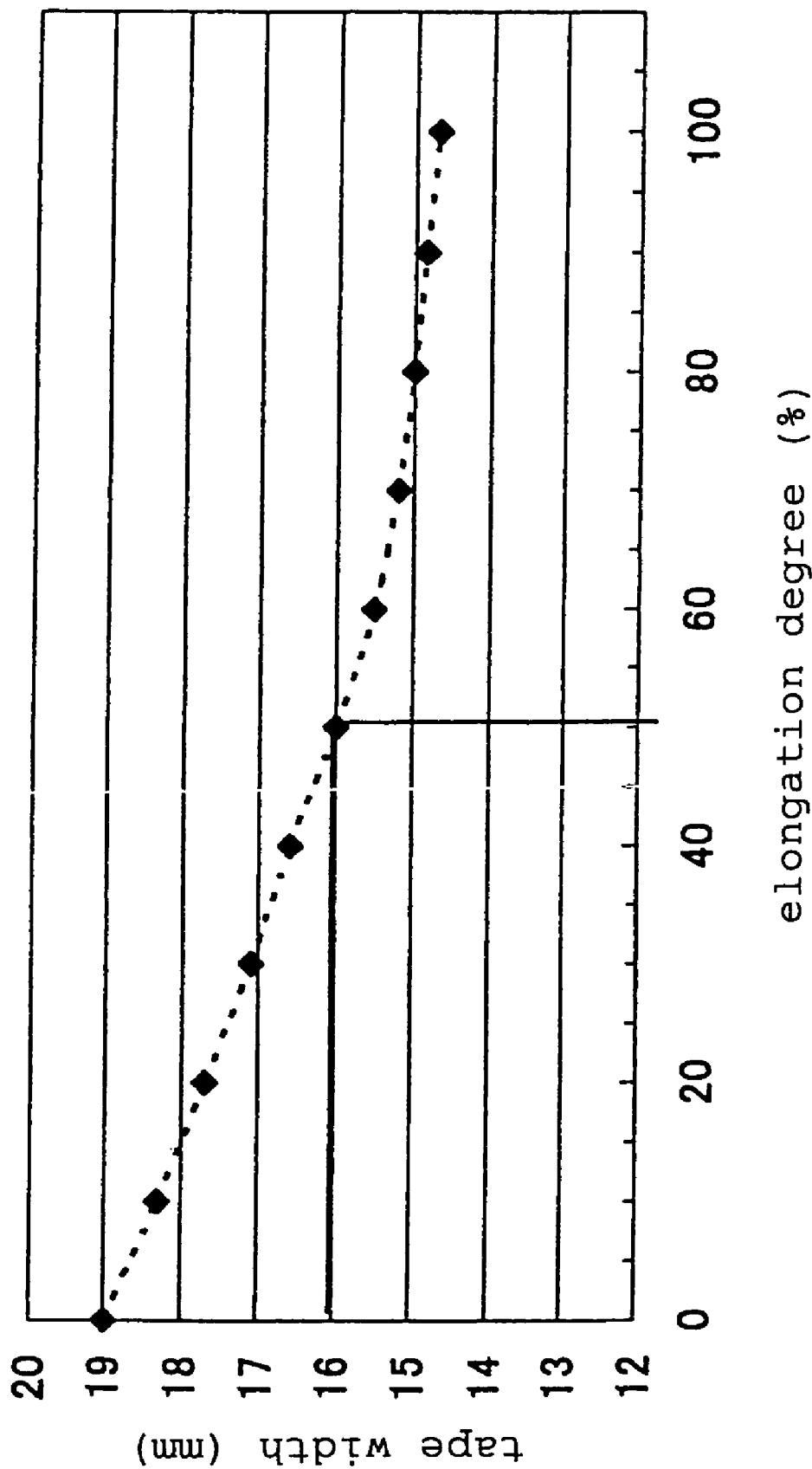

ACRYLIC PRESSURE-SENSITIVE ADHESIVE COMPOSITION AND PRESSURE-SENSITIVE ADHESIVE TAPE

CROSS-REFERENCE TO RELATED APPLICATION

This patent application is a divisional of U.S. patent application Ser. No. 10/377,234, filed Feb. 27, 2003, now U.S. Pat. No. 7,109,266.

FIELD OF THE INVENTION

The present invention relates to a pressure-sensitive adhesive composition (hereinafter to be also referred to as a pressure-sensitive adhesive) and a pressure-sensitive adhesive tape. More particularly, this invention relates to an acrylic pressure-sensitive adhesive composition, which has high adhesive strength (particularly initial adhesive strength) to an adherend having poor polarity, such as olefin polymer and the like, and which retains adhesive strength even after heating and preservation (or retains adhesive strength even after lapse of time after heating, particularly adhesive strength to a backside of the adhesive tape (i.e., substrate surface free of adhesive of the adhesive tape)), as well as a pressure-sensitive adhesive tape having a certain elongation degree upon unwinding, applicable to binding purposes and free of peeling off of the tape end after winding.

BACKGROUND OF THE INVENTION

For example, for a pressure-sensitive adhesive and a pressure-sensitive adhesive tape to be used in respective fields of vehicles such as automobiles, trains, buses and the like, home appliances such as televisions, personal computers, air conditioners and the like, OA facilities such as facsimiles, photocopiers and the like, aircraft, boats and ships, houses, factories and the like, polyvinyl chloride (hereinafter to be referred to as PVC) has been widely used as an adherend or a substrate. However, incineration of PVC may produce toxic gases such as dioxins, chlorine gas and the like. Out of the growing environmental awareness in recent years, there is a move toward limitation on the use of PVC and conversion to materials posing less environmental burden. As a result, an alternative to PVC has been strongly demanded. Similarly, an alternative to a halogen atom-containing pressure-sensitive adhesive, and an alternative to a pressure-sensitive adhesive tape comprising a halogen atom-containing material as a substrate are also desired.

For an alternative to the halogen-containing materials such as PVC and the like, olefin polymers such as polyethylene, polypropylene and the like have been increasingly used from the aspects of cost and flexibility. A pressure-sensitive adhesive tape using these materials as a substrate, and a pressure-sensitive adhesive and a pressure-sensitive adhesive tape for which a product using these materials is an adherend have been considered.

When such olefin polymer is used as a substrate or adherend of the adhesive tape, rubber and acrylic pressure-sensitive adhesives are used from the aspect of cost.

When a rubber pressure-sensitive adhesive is used, however, adhesive strength to a substrate or adherend made of an olefin polymer becomes too strong, which poses problems for a pressure-sensitive adhesive tape, such as unattainable unwinding of a tape, and the like. Upon unwinding, the tape often suffers from stretched substrate, broken substrate and the like. When a rubber pressure-sensitive adhesive is used for an adherend made of an olefin polymer, problems occur due to its excessive adhesive strength, as evidenced by a remainder of the adhesive on an adherend upon peeling off (i.e., adhesive residue), and the like.

When an acrylic pressure-sensitive adhesive is selected, problems occur such as weak adhesive strength to the surface of a substrate or adherend having poor polarity, such as olefin polymer and the like, and the like.

For example, in the case of a binding tape, the unwinding force of the tape and the fastening force thereof are both weak, thus failing to achieve sufficient winding. In addition, since the adhesive strength to the substrate (backside thereof) is weak, the tape end may defectively peel off after winding the tape and the like.

The peeling of the end can be prevented by crosslinking the adhesive to increase cohesive strength and the like, but the adhesive strength simultaneously decreases, and the unwinding force becomes still weaker.

For compensation, addition of a tackifier (e.g., rosin tackifier, terpene tackifier, aliphatic petroleum hydrocarbon ($C_5$) tackifier, aromatic petroleum hydrocarbon ($C_9$) tackifier and a hydrogenated compound thereof, and the like) to an acrylic pressure-sensitive adhesive in an attempt to increase the adhesive strength of the adhesive has been considered.

However, it has been elucidated that, even if such improvement is made, a tape, wherein the substrate is an olefin polymer and the adhesive is an acrylic pressure-sensitive adhesive, tends to show weaker backside adhesive strength after heating and preservation, and weaker adhesive strength after adhesion to an olefin polymer adherend, heating and preservation, peeling off and adhesion again to the olefin polymer adherend, as compared to the initial adhesive strength. In addition, there have been problems of degraded unwinding force and easy occurrence of end peeling.

When the flexibility and stretchability necessary for a pressure-sensitive adhesive tape are considered, moreover, the use of an olefin polymer having comparatively higher flexibility as an olefin polymer, such as ethylene-vinyl acetate copolymer (hereinafter to be referred to as EVA), ethylene-ethyl acrylate copolymer (hereinafter to be referred to as EEA) and the like, has been considered. Particularly when these olefin polymers are used, degradation of the adhesive strength after heating and preservation is significant. It has been found that higher the content of a polar component, such as a vinyl acetate component, an ethyl acrylate component and the like, is, such tendency becomes more noticeable.

The decrease in the adhesive strength after heating and preservation is considered to be attributable to the improved compatibility of the tackifier in the acrylic pressure-sensitive adhesive with an olefin polymer in a substrate or an adherend during heating and preservation, which in turn caused the shift of the tackifier into the substrate or adherend.

In fact, when the amount of the tackifier that shifted into the substrate or adherend was quantified, one having lower adhesive strength showed a greater amount of shifted tackifier.

When the amount of the tackifier increases, the cohesive strength of the adhesive becomes lower, which in turn problematically causes a cohesive failure upon peeling and the like.

Accordingly, it is an object of the present invention to provide an acrylic pressure-sensitive adhesive composition having high adhesive strength (particularly initial adhesive strength) to an adherend made of an olefin polymer material heretofore been considered to be poorly adhesive, wherein degradation of the adhesive strength after heating and preservation has been suppressed; a pressure-sensitive adhesive tape comprising the adhesive composition; particularly a pressure-sensitive adhesive tape comprising an olefin polymer material as a substrate, which shows a sufficient unwinding force when used for binding, and which is free of end peeling after binding; a pressure-sensitive adhesive composition substantially free of a halogen atom; and a pressure-sensitive adhesive tape comprising a pressure-sensitive adhesive and a substrate substantially free of a halogen atom.

SUMMARY OF THE INVENTION

As a result of the intensive studies in an attempt to solve the above-mentioned problems, it has been found by the present inventors that an acrylic pressure-sensitive adhesive composition comprising an acrylic polymer and a "tackifier obtained by acid modification of a tackifier resin inherently free of an acid component" added thereto, and a pressure-sensitive adhesive tape comprising a substrate made of a film comprising an "olefin polymer" and/or a "thermoplastic resin containing a carbonyl oxygen atom in the molecular skeleton", and said composition applied thereon have high "initial adhesive strength" to an adherend having poor polarity, such as olefin polymer and the like, and suppress degradation of the "adhesive strength after heating and preservation (particularly adhesive strength to the backside of the adhesive tape)", and that said pressure-sensitive adhesive tape has superior properties evidenced by an unwinding force preventing, during binding of wires and the like, loose binding of the wires and wrinkles on the tape, and difficult peeling of tape end after binding and the like.

Accordingly, the present invention provides the following [1] to [14].

[1] An acrylic pressure-sensitive adhesive composition comprising an acrylic polymer and a tackifier obtained by acid modification of a tackifier resin inherently free of an acid component.

[2] The composition of the above-mentioned [1], wherein the tackifier has a weight-average molecular weight (Mw) of 1000-6000, and an acid value of 5-100 mg KOH/g.

[3] The composition of the above-mentioned [1] or [2], wherein the tackifier is contained in a proportion of 5-80 parts by weight relative to 100 parts by weight of the acrylic polymer.

[4] The composition of the above-mentioned [1], wherein the tackifier having an acid value of 5-100 mg KOH/g is contained in a proportion of 5-80 parts by weight relative to 100 parts by weight of the acrylic polymer.

[5] The composition of any of the above-mentioned [1]-[4], which is substantially free of a halogen atom.

[6] A pressure-sensitive adhesive tape comprising a substrate made of a film comprising an olefin polymer or a thermoplastic resin containing a carbonyl oxygen atom in the molecular skeleton, and the acrylic pressure-sensitive adhesive composition of any of the above-mentioned [1]-[5] on at least one surface of the substrate.

[7] The tape of the above-mentioned [6], wherein the substrate is made of a film comprising an olefin polymer.

[8] The tape of the above-mentioned [7], wherein the substrate further comprises a thermoplastic resin containing a carbonyl oxygen atom in the molecular skeleton.

[9] The tape of any of the above-mentioned [6]-[8], wherein the substrate is a film comprising an inorganic flame retardant in a proportion of 20-200 parts by weight relative to 100 parts by weight of the olefin polymer.

[10] The tape of any of the above-mentioned [6]-[9], wherein the substrate and the pressure-sensitive adhesive composition are substantially free of a halogen atom.

[11] The tape of the above-mentioned [6], wherein the substrate comprises the thermoplastic resin in a proportion of 1-100% of the total amount of the olefin polymer and the thermoplastic resin.

[12] The tape of the above-mentioned [8] or [11], wherein the thermoplastic resin is an olefin polymer containing a carbonyl oxygen atom in the molecular skeleton.

[13] The tape of any of the above-mentioned [6]-[12], which is used for binding.

[14] The tape of the above-mentioned [13], wherein the tape has an elongation degree upon unwinding of 2%-60% at an unwinding rate of 30 m/min, and a peeled end portion of 0-1.0 mm when wound three rounds around a steel rod having a diameter of 2 mm.

BRIEF DESCRIPTION OF THE DRAWINGS

FIG. 2 shows the relationship between a tape width and stretch (elongation degree) upon drawing a tape.

BEST MODE FOR EMBODYING THE INVENTION

<Pressure-sensitive Adhesive Composition>

Figure 1:
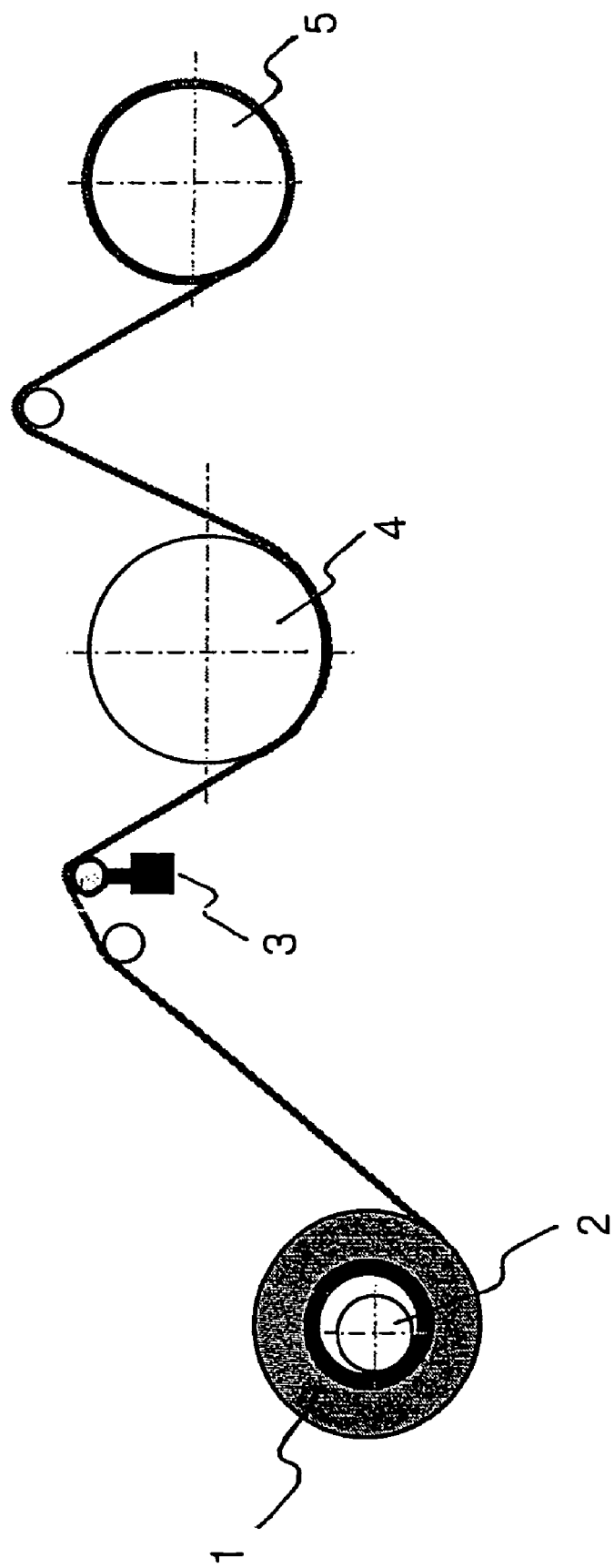
FIG. 1 is a schematic showing of a measurement apparatus of an unwinding force, wherein (1) shows a pressure-sensitive adhesive tape, (2) shows a static axis, (3) shows a detector, (4) shows a drive roll and (5) shows a takeup roll.

The acrylic pressure-sensitive adhesive composition of the present invention comprises an acrylic polymer and a tackifier obtained by acid modification of a tackifier resin inherently free of an acid component.

The "acrylic polymer" to be used as a main component of the pressure-sensitive adhesive composition of the present invention is exemplified by a homopolymer of (meth)acrylate, and a copolymer of (meth)acrylate and a copolymerizable monomer, and the like. For example, acrylic polymers obtained by homopolymerization or copolymerization of monomers such as alkyl(meth)acrylate (e.g., methyl ester, ethyl ester, propyl ester, butyl ester, 2-ethylhexyl ester, octyl ester and the like), glycidyl(meth)acrylate, (meth)acrylic acid, itaconic acid, maleic anhydride, (meth)acrylamide, (meth)acryl N-hydroxyamide, alkylaminoalkyl(meth)acrylate (e.g., dimethylaminoethyl methacrylate, t-butylaminoethyl methacrylate and the like), vinyl acetate, styrene, acrylonitrile and the like are exemplified. One or more kinds of the above-mentioned monomers can be used.

The main monomer of the above-mentioned acrylic polymer is preferably alkyl(meth)acrylate, whose homopolymer (polymer obtained by homopolymerization) generally has a glass transition temperature of not higher than −50° C. As used herein, the main monomer of acrylic polymer means a monomer having a (meth)acrylic acid component, from among the above-mentioned monomers. Particularly preferable examples of the main monomer include butyl(meth)acrylate, 2-ethylhexyl(meth)acrylate, n-propyl(meth)acrylate, n-octyl(meth)acrylate and the like.

The acrylic polymer to be used in the present invention can be obtained by conventional polymerization method, which is exemplified by solution polymerization, emulsion polymerization and the like. In these polymerization methods, generally known additives may be used. For example, the polymerization initiator used for solution polymerization may be organic peroxide such as benzoyl peroxide, t-butylhydroperoxide and the like, azo compound such as azobisisobutyronitrile and the like, and the like. In the case of emulsion polymerization, a surfactant is further necessary, and, for example, non-ionic surfactant (e.g., polyoxyethylenealkyl ether, polyoxyalkylenealkyl ether, polyoxyethylene derivative, polyoxyethylenealkylamine, polyoxyethylene fatty acid ester, glycerol fatty acid ester, sorbitan fatty acid ester etc.), anionic surfactant (e.g., salt of fatty acid, salt of alkylphosphoric acid, salt of alkylsulfate, salt of alkylbenzenesulfonic acid, salt of alkylnaphthalenesulfonic acid, salt of alkyldiphenyletherdisulfonic acid etc.) and the like are used. These may be used in combination.

The "tackifier obtained by acid modification of a tackifier resin inherently free of an acid component" in the present specification means a compound obtained by "acid modification" of "a tackifier resin inherently free of an acid component".

The "tackifier resin inherently free of an acid component" in the present specification means a resin conventionally used as a tackifier, whose molecule structure is free of an acid component unless a monomer unit having an acid functional group is intentionally added to the resin. Examples thereof include terpene resin (e.g., α-pinene, β-pinene, dipentene etc.), petroleum hydrocarbon resin (e.g., aliphatic ($C_5$) hydrocarbon resin, alicyclic hydrocarbon resin (DCPD), aromatic ($C_9$) hydrocarbon resin, aliphatic/aromatic ($C_5/C_9$) copolymerized hydrocarbon resin etc.), coumarone-indene resin, styrene resin, xylene resin and the like, and these resins may be used after hydrogenation.

The "acid modification" means polymerization of the above-mentioned resin with a monomer unit having an acid functional group such as carboxylic acid group-containing monomer, carboxylate group-containing monomer, acid anhydride group-containing monomer and the like.

Examples of the carboxylic acid group-containing monomer include maleic acid, fumaric acid, acrylic acid, methacrylic acid, itaconic acid and the like; examples of the carboxylate group-containing monomer include vinyl acetate, vinyl propionate, vinyl benzoate and the like; and examples of the acid anhydride group-containing monomer include maleic anhydride, fumaric anhydride, itaconic anhydride and the like.

A method for polymerization of the above-mentioned monomer with the above-mentioned resin (namely, acid modification) may be a polymerization method known per se. For example, graft polymerization of the above-mentioned "tackifier resin inherently free of an acid component" with the above-mentioned monomer in the presence of a radical polymerization initiator may be used.

Examples of the radical polymerization initiator include organic peroxide such as hydroperoxide, dialkylperoxide, diacylperoxide and the like. In addition, a method comprising dissolving the above-mentioned resin and acid anhydride group-containing monomer in an organic solvent such as xylene and the like, adding the above-mentioned initiator and allowing to react with heating and stirring; a method comprising melting a resin with heating without using a solvent, and allowing to react by adding the above-mentioned acid anhydride group-containing monomer and initiator, or other method can be employed.

The acid modified resin (i.e., tackifier of the present invention) obtained as mentioned above has a weight-average molecular weight (Mw) of preferably 1000-6000, more preferably 1500-4000. A tackifier having a weight-average molecular weight (Mw) of less than 1000 tends to show a smaller effect of acid modification. This is because the tackifier having a lower molecular weight easily dissolves in and shifts into an olefin polymer, and as a result, shows lower adhesive strength after heating and preservation. The tackifier having a weight-average molecular weight (Mw) of more than 6000 gets too hard and makes the entire pressure-sensitive adhesive hard. As a result, the effect of a tackifier becomes less, which may cause a cohesive failure in some cases.

The acid value to be the index of acid modification is preferably 5-100 mg KOH/g, more preferably 10-50 mg KOH/g. When the acid value is less than 5 mg KOH/g (when tackifier has lower polarity), acid modification tends to show a smaller effect, wherein the tackifier shifts into the olefin polymer and adhesive strength after heating and preservation becomes lower. This occurs when the solubility parameters of the tackifier and the olefin polymer are close. When the acid value is greater than 100 mg KOH/g, the difference in the polarity from the olefin polymer becomes too large, which in turn decreases the initial adhesive strength of the pressure-sensitive adhesive.

The amount of the tackifier to be added is free of any particular limitation because the necessary adhesive strength varies depending on its application. To achieve an effective adhesive strength relative to the olefin polymer, addition of the tackifier in a proportion of 5-80 parts by weight, more preferably 10-50 parts by weight, per 100 parts by weight of the acrylic polymer is appropriate.

When the amount of the tackifier to be added is smaller than 5 parts by weight, the effect of the tackifier tends to become smaller. When the amount of the tackifier to be added exceeds 80 parts by weight, the cohesive strength of the pressure-sensitive adhesive composition as a whole decreases, which in turn makes the holding property of the composition unattainable and causes cohesive failure in the composition during peeling. This often causes adhesive residue.

As described above, addition of a "tackifier obtained by acid modification of a tackifier resin inherently free of an acid component" to the adhesive layer of the pressure-sensitive adhesive tape of the present invention is useful for preventing the tackifier from shifting into the olefin polymer during heating and preservation, and for maintaining high initial adhesive property even after heating and preservation.

In addition, adjustment of the tackifier to have the weight-average molecular weight and acid value in the above-mentioned ranges, and addition thereof to the acrylic adhesive at the aforementioned weight ratio are preferable for the suppression of a cohesive failure in the pressure-sensitive adhesive composition, increasing the adhesive strength (particularly initial adhesive strength) to the olefin polymer, and maintaining high initial adhesive strength even after heating and preservation.

The pressure-sensitive adhesive composition may contain additives such as "crosslinking agent", "flame retardant", "antioxidant", "coloring agent" and the like as necessary.

Examples of the "crosslinking agent" include isocyanate compound, melamine resin, urea resin, epoxy resin and the like, with preference given to isocyanate compound. For example, aromatic diisocyanate compound (e.g., tolylenediisocyanate, diphenylmethanediisocyanate, xylylenediisocyanate etc.), aliphatic or alicyclic diisocyanate compound (e.g., hexamethylenediisocyanate, isophoronediisocyanate etc.), triisocyanate compound (e.g., trimer of tolylenediisocyanate of trimethylolpropane, triphenylmethanetriisocyanate etc.) and the like can be used.

Examples of the "flame retardant" include phosphates such as triphenylphosphate, trioctylphosphate and the like; nitrogen-containing compound such as triazine compound (e.g., melamine, melaminecyanurate, melaminephosphate etc.), guanidine compound (e.g., guanidine sulfamate, guanidine carbonate, guanidine phosphate etc.) and the like; metal hydrate such as aluminum hydroxide, magnesium hydroxide and the like; and the like.

Examples of the "antioxidant" include compounds such as amines (e.g., napthylamines, diphenylamines, phenylenediamines, quinolines etc.), phenols (e.g., monophenols, bisphenols, trisphenols, polyphenols, thiobisphenols, hindered phenols etc.), phosphorus compounds (e.g., phosphites, phosphonites etc.), sulfur compounds (e.g., thioethers, thioureas etc.), and the like.

Examples of the "coloring agent" include copper phthalocyanine, aniline black and the like.

<Pressure-sensitive Adhesive Tape>

The present invention also provides a pressure-sensitive adhesive tape comprising a film substrate and the aforementioned pressure-sensitive adhesive composition applied thereon.

The pressure-sensitive adhesive tape of the present invention is characterized in that the above-mentioned acrylic adhesive composition is applied on at least one surface of a substrate made of a film containing an "olefin polymer" and/or a "thermoplastic resin containing a carbonyl oxygen atom in the molecular skeleton".

<Substrate>

The film substrate of the pressure-sensitive adhesive tape to be used in the present invention contains, for example, at least an olefin polymer. Examples of the "olefin polymer" include polyethylene (e.g., low density polyethylene, low density linear polyethylene, medium density polyethylene, high density polyethylene etc.), polypropylene, polybutene, polybutylene, polybutadiene and the like, with preference given to polyethylene and polypropylene. Particularly preferred is polyethylene. One or more kinds of these may be used. However, the above-mentioned "olefin polymer" here does not contain a carbonyl oxygen atom (namely, oxygen atom identified by carbonyl group).

The substrate preferably contains, along with the olefin polymer, a "thermoplastic resin containing a carbonyl oxygen atom in the molecular skeleton" to afford suitable flexibility.

The "thermoplastic resin containing a carbonyl oxygen atom in the molecular skeleton" in the present specification means a thermoplastic resin component containing a carbonyl oxygen atom (namely, oxygen atom identified by carbonyl group) in the molecular skeleton. Examples thereof include olefin polymer such as polyester resin, polycarbonate resin, polyether resin, plasticized polyolefin resin and the like, and the like, which contain a carbonyl oxygen atom in the molecular skeleton. Particularly, a plasticized polyolefin resin containing a carbonyl oxygen atom in the molecular skeleton is preferable. Preferable examples thereof include ethylene copolymer or an ionomer thereof, which contains a carbonyl oxygen atom in the molecular skeleton, having vinyl ester compound and/or α,β-unsaturated carboxylic acid or a derivative thereof and the like as a constituent monomer or comonomer, and the like.

Examples of the vinyl ester compound constituting the above-mentioned ethylene copolymer and an ionomer thereof containing a carbonyl oxygen atom in the molecular skeleton include lower alkyl ester of vinyl alcohol, such as vinyl acetate and the like, and the like. Examples of the α,β-unsaturated carboxylic acid and a derivative thereof include unsaturated carboxylic acid such as acrylic acid, methacrylic acid, maleic acid, fumaric acid, maleic anhydride, itaconic anhydride and the like and anhydrides thereof; unsaturated carboxylates such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, stearyl acrylate, stearyl methacrylate, lauryl acrylate, lauryl methacrylate, monomethyl maleate, glycidyl acrylate, glycidyl methacrylate and the like, and ionomers thereof, and the like. Of these, alkyl(meth)acrylate is preferable, and ethyl acrylate is particularly preferable.

Preferable examples of the ethylene copolymer and ionomers thereof, which contain a carbonyl oxygen atom in the molecular skeleton, include ethylene-acrylic acid copolymer, ethylene-methacrylic acid copolymer, ethylene-ethyl acrylate copolymer, ethylene-acrylic acid-ethyl acrylate copolymer, ethylene-vinyl acetate copolymer, ethylene-vinyl acetate-ethyl acrylate copolymer, ethylene-glycidyl methacrylate copolymer, ethylene-glycidyl methacrylate-ethyl acrylate copolymer and ionomers thereof, and the like, from which one or more kinds are used.

The contents of the thermoplastic resin containing a carbonyl oxygen atom (namely, oxygen atom identified by carbonyl group) in the molecular skeleton and the olefin polymer in the substrate are not particularly limited. The content of the above-mentioned thermoplastic resin can be adjusted as appropriate depending on the application. That is, the content of the above-mentioned thermoplastic resin in the substrate is 1-100%, preferably 1-99%, more preferably 15-85%, most preferably 30%-70%, of the total amount of the above-mentioned olefin polymer and the thermoplastic resin. For the application requiring flexibility, the content of the thermoplastic resin can be increased. The entire amount may be occupied by the thermoplastic resin (i.e., content=100%).

For the application requiring flexibility, an ethylene copolymer or an ionomer thereof having higher flexibility can be selected similarly. The "ethylene copolymer or its ionomer having higher flexibility" means an ethylene copolymer or an ionomer thereof exemplified for the above-mentioned thermoplastic resin, which contains a greater amount of the components having a carbonyl oxygen atom in the molecular skeleton.

The carbonyl oxygen atom is contained in a proportion of 1 wt %-20 wt %, preferably 3 wt %-15 wt %, more preferably 5 wt %-12 wt %, relative to 100 wt % of the thermoplastic resin.

In the present invention, the substrate made of a film comprising the olefin polymer exemplified above may further contain a flame retardant (e.g., inorganic flame retardant such as inorganic metal compound and the like, and the like) to impart flame retardancy.

Examples of the inorganic flame retardant include metal hydroxide such as aluminum hydroxide, magnesium hydroxide, zirconium hydroxide, calcium hydroxide, barium hydroxide and the like; metal carbonate such as basic magnesium carbonate, magnesium-calcium carbonate, calcium carbonate, barium carbonate, dolomaite and the like; metal hydrate (hydrate of metal compound) such as hydrotalcite, borax and the like; barium metaborate; magnesium oxide; and the like. These may be used alone or in combination. Of these, metal hydroxide such as aluminum hydroxide, magnesium hydroxide, zirconium hydroxide, calcium hydroxide, barium hydroxide and the like, basic magnesium carbonate and hydrotalcite are superior in the flame retardancy-imparting effect and economically advantageous. While the particle size of the inorganic flame retardant varies depending on the kind of the compound, the average particle size thereof is, for example, suitably about 0.1-50 µm, preferably about 0.5-20 µm, in the case of metal hydroxide such as aluminum hydroxide, magnesium hydroxide and the like. The particle size here is measured by laser analysis.

The suitable amount of the inorganic flame retardant to be added is generally 20-200 parts by weight, preferably 40-150 parts by weight, per 100 parts by weight of the olefin polymer. When the amount of the inorganic flame retardant is smaller than this range, sufficient flame retardancy as a substrate for a pressure-sensitive adhesive tape is difficult to achieve, whereas when it is greater than this range, flexibility and elongation property of the substrate for the tape tend to fall.

A char forming agent may be added to promote formation of char (char layer) of an inorganic flame retardant. Examples of the char forming agent include one containing red phosphorus.

When using a char forming agent containing red phosphorus, for example, a method that does not produce toxic phosphines upon heating in the presence of water (stabilization of red phosphorus surface) can be utilized. For example, a method comprising coating red phosphorus with metal hydroxide selected from aluminum hydroxide, magnesium hydroxide, zinc hydroxide, titanium hydroxide and the like; a method further comprising coating red phosphorus that underwent the coating treatment (double coating of red phosphorus), or other method can be used. For the double coating on red phosphorus, a method comprising forming a coating (second coating) of a thermosetting resin (e.g., phenol resin and the like) on the above-mentioned coating (first coating) of red phosphorus with metal hydroxide is preferable. A suitable content of the char forming agent containing red phosphorus is generally 2-10 parts by weight, preferably 4-8 parts by weight, per 100 parts by weight of the olefin polymer.

When a char forming agent containing red phosphorus is used in combination with an inorganic flame retardant, more preferable results can be obtained by a concurrent use with at least one kind of additive selected from carbon black and borate (e.g., zinc borate, barium metaborate, borax and the like). In this case, a suitable content of at least one kind of additive selected from carbon black and borate is generally 0.5-10 wt %, preferably 1-5 wt %, per 100 parts by weight of the olefin polymer.

Furthermore, the substrate of the pressure-sensitive adhesive tape may contain an additive as necessary, which is selected from the following: inorganic filler such as titanium oxide, zinc oxide and the like; antiaging agent or antioxidant such as amines, phenols, phosphorus compounds, sulfur compounds and the like; ultra-violet light absorbers such as salicylic acid derivatives, benzophenones, benzotriazoles and hindered amines; lubricants such as esters, amides, bisamides, metal soaps and the like; plasticizer such as phosphates, adipates, sebacates, citrates, glycolates, trimellitates, phthalates, polyesters and the like; coloring agents such as titanium oxide, carbon black, copper phthalocyanine and the like; and the like.

For the pressure-sensitive adhesive tape of the present invention, when the substrate and the pressure-sensitive adhesive composition are "substantially free of a halogen atom", it means that a substance containing a halogen atom is not used intentionally as a main component of the substrate and the composition. However, it does not exclude presence of a halogen atom at a level barely sufficient to be detected or in an amount that does not cause an adverse reaction, when the compositions of the substrate and the pressure-sensitive adhesive composition are analyzed using various instrumental analysis means, and contamination of a trace amount of a halogen compound from the catalyst used for polymerization.

<Production Method of Pressure-sensitive Adhesive Tape>

Preparation of Substrate Film

In the present invention, the substrate of the pressure-sensitive adhesive tape is generally obtained by dry blending the above-mentioned olefin polymer and/or the above-mentioned thermoplastic resin with the above-mentioned arbitrary additives as necessary, kneading the mixture in a banbury mixer, roll, extruder, pressurized kneader and the like, and forming the kneaded product into a film by a known forming method such as pressure forming, calendar-forming, injection forming, extrusion forming and the like.

While the suitable thickness of the substrate varies depending on the application of the pressure-sensitive adhesive tape, it is generally 0.01-1 mm, preferably 0.05-0.5 mm.

For the substrate of the present invention, a crosslinking treatment may be carried out after formation of a film, which comprises ionizing radiation of electron beam, β-lay, γ-ray and the like, or a crosslinking treatment may be carried out during the formation process, which comprises adding a crosslinking agent (e.g., silane compound, organic peroxide, phenol resin, epoxy resin, amine compounds etc.) or crosslinking aids (e.g., fatty ester of methacrylic acid, metal salt of (meth)acrylic acid, functional vinyl monomer, 1,2-polybutadiene and the like) to a material for forming a film.

In addition, the surface of a substrate that comes into contact with a pressure-sensitive adhesive may be treated, as necessary, to enhance adhesion between the adhesive layer and the substrate. A method for such treatment may be, for example, a method comprising forming irregularities on the surface, on which a pressure-sensitive adhesive is applied, utilizing difference in the properties of both surfaces of the substrate, a method comprising corona discharge treatment of a surface, on which a pressure-sensitive adhesive is applied, thereby to afford different wettability for adhesion, a method comprising insertion of a known anchor coating agent between a pressure-sensitive adhesive and the substrate and other method. The treatment for enhancing adhesiveness in the present invention is not limited to these, but a different suitable method may be employed as necessary.

Preparation of Pressure-sensitive Adhesive Tape

The pressure-sensitive adhesive tape of the present invention is produced by, for example, applying, where necessary, a treatment described above to a surface of the substrate formed according to any of the methods described above, which comes into contact with the adhesive layer, thereby to enhance the adhesiveness therewith, and then applying the acrylic pressure-sensitive adhesive composition of the present invention to at least one surface of the substrate.

The method for preparing an acrylic pressure-sensitive adhesive composition may be, but not particularly limited to, a solution type or emulsion type preparation method and the like.

As the application method of an acrylic pressure-sensitive adhesive composition, any conventionally known method, such as casting method, roll coater method, reverse coater method, doctor blade method and the like can be employed.

The thickness (thickness after drying) of the acrylic pressure-sensitive adhesive composition varies depending on the application of the pressure-sensitive adhesive tape, but it is generally 10-50 μm, preferably 15-40 μm, most preferably 20-35 μm.

While the thickness of the pressure-sensitive adhesive tape of the present invention obtained as the aforementioned varies depending on the materials to be used, it is generally 20 μm-1000 μm, preferably 50 μm-600 μm, more preferably 100 μm-400 μm.

<Evaluation of Performance of Pressure-Sensitive Adhesive Tape>

The pressure-sensitive adhesive composition and pressure-sensitive adhesive tape of the present invention are superior in adhesive strength to an adherend having poor polarity, such as olefin polymer and the like.

Since the pressure-sensitive adhesive tape comprises, for example, an olefin polymer as a substrate, it can be used as an alternative to a conventional pressure-sensitive adhesive tape, wherein a PVC material is used as a substrate of the adhesive tape.

In addition, because the pressure-sensitive adhesive composition and the pressure-sensitive adhesive tape do not substantially contain a halogen atom in the adhesive composition and the substrate of the adhesive tape, they are useful as an alternative to a pressure-sensitive adhesive tape using a material containing halogen.

When the pressure-sensitive adhesive tape is used for binding, the tape is particularly required to have sufficient unwinding force and to be free of peeling of the end (peeled end portion of the adhesive tape upon winding).

The binding ability has been conventionally evaluated in terms of unwinding force, tensile strength and the like of the tape. For example, the unwinding force has been evaluated by direct measurement of unwinding force. However, appropriate and precise evaluation of binding ability is limited if the evaluation is based solely on the unwinding force, since the unwinding force is affected by the tensile property and thickness of the substrate and the thickness of the adhesive, and the binding state also varies depending on the thickness of the tape and the like.

Therefore, the present inventors have found a method for easily deriving an elongation degree (%) upon unwinding of a pressure-sensitive adhesive tape. According to this method, the correlation between the width of the pressure-sensitive adhesive tape (length (mm) in the direction perpendicular to the longitudinal direction of the pressure-sensitive adhesive tape) and the elongation degree (%) of the pressure-sensitive adhesive tape is determined in advance, based on which correlation, an elongation degree (%) upon unwinding of a pressure-sensitive adhesive tape is determined from the width (mm) of the tape measured when the tape is unwound. By evaluating elongation degree (%) upon unwinding of a pressure-sensitive adhesive tape according to this method, clear evaluation and definition of the binding ability of the tape have become possible, irrespective of the types and thicknesses of the tape substrate (hereinafter sometimes to be referred to as a base) and the adhesive.

In the present invention, the correlation between the width (mm) and elongation degree (%) of a pressure-sensitive adhesive tape can be determined in detail as in the following.

A pressure-sensitive adhesive tape having an optional width is cut out in about 300 mm in its longitudinal direction and two reference marks are drawn in the middle in the longitudinal direction at 100 mm interval, which direction is perpendicular to the longitudinal direction of the adhesive tape. The both ends of the adhesive tape are drawn to impart a tension in the longitudinal direction of the adhesive tape. The adhesive tape is stretched, after which the both ends of the adhesive tape are fixed, and the distance between the reference marks on the adhesive tape after application of the tension and the width of the adhesive tape are measured.

The elongation degree (%) is "elongation (mm) of pressure-sensitive adhesive tape [i.e., (distance (mm) between reference marks on pressure-sensitive adhesive tape after application of tension)-(distance (mm) between reference marks on pressure-sensitive adhesive tape before application of tension)]" relative to "distance (mm) between reference marks on pressure-sensitive adhesive tape before application of tension", as expressed in percentage (%), which is calculated according to the following formula.

$$\text{Elongation degree (\%)} = \frac{\begin{array}{c}\text{(distance (mm) between reference marks on} \\ \text{pressure-sensitive adhesive tape after} \\ \text{application of tension)} - \text{(distance (mm)} \\ \text{between reference marks on pressure-sensitive} \\ \text{adhesive tape before application of tension)}\end{array}}{\begin{array}{c}\text{distance (mm) between reference marks on} \\ \text{pressure-sensitive adhesive tape before} \\ \text{application of tension}\end{array}} \times 100$$

For example, when a tension is applied to a pressure-sensitive adhesive tape wherein the distance between reference marks before application of tension is 100 mm and the distance between reference marks on the adhesive tape after application became 200 mm, the elongation degree is 100%.

It is preferable to use the correlation between the width (mm) and the elongation degree (%) of an adhesive tape as determined as mentioned above after plotting on a graph and the like.

Utilizing the correlation between the width (mm) and the elongation degree (%) of the pressure-sensitive adhesive tape as determined in advance as mentioned above, the optimal range of the elongation degree upon unwinding of an adhesive tape relating to the performance of the adhesive tape for binding was determined from the width upon unwinding of the adhesive tape.

In addition, by combining the "elongation degree upon unwinding" determined in this way and a "peeled end portion (length of peeled end)" upon winding, precise evaluation of a pressure-sensitive adhesive tape for binding has become available.

In the present invention, by the "peeled end portion (length of peeled end)" is meant the length in the longitudinal direction of the portion of a pressure-sensitive adhesive tape that came off from the backside thereof after winding the adhesive tape three rounds around a steel rod having a diameter of 2 mm and heat treating the tape at 100° C. for 240 hr, namely, the distance in the longitudinal direction of the adhesive tape between the contact point with the backside thereof and the end of the released adhesive tape. The loose end of the adhesive tape may occur when the adhesive strength of the adhesive tape to the backside thereof is weak, when the tape substrate is stiff, when the substrate is highly resilient and the like.

The pressure-sensitive adhesive tape of the present peeled end portion in the ranges determined by the evaluation method above, as a result of which a pressure-sensitive adhesive tape superior in binding has been obtained.

The "elongation degree (%) upon unwinding" of the pressure-sensitive adhesive tape of the present invention is 2%-60%, preferably 3%-50%, more preferably 4%-40%, at an unwinding rate of 30 m/min.

For example, when wires are to be bound together, an elongation degree upon unwinding of less than 2% causes weaker bindability, which in turn leads to loose binding of the wires or wrinkles on the tape after winding. In addition, when the elongation degree upon unwinding is greater than 60%, drastic changes in the tape width and decrease in the binding force occur, possibly resulting in a broken tape, because the yield point exceeds that of, for example, an olefin polymer in the substrate when the tape is unwound. When the tape is used for electronic insulation purposes, the substrate comes to have a smaller thickness due to stretching, and the necessary insulating ability may not be afforded.

In addition, when the substrate contains an inorganic filler, excessive stretching of the tape produces cracks between the inorganic filler and the resin, thus resulting in whitening of the tape. When the cracks between the inorganic filler and the resin are deep, they could cause not only visual changes but lower insulating ability. In this case, the unwinding without whitening of the substrate is demanded.

The "peeled end portion (length of peeled end)" of the pressure-sensitive adhesive tape of the present invention is 0-1.0 mm, preferably 0-0.8 mm, more preferably 0-0.5 mm, when the tape is wound 3 rounds around a steel rod having a diameter of 2 mm and heat treating it at 100° C. for 240 hr.

While the tape is ideally free of a peeled end portion after winding, the peeled end portion of not more than 1.0 mm under the above conditions does not cause any particular practical problem. When it is greater than 1.0 mm, the end peeling may unpreferably proceed further by the use thereof at a high temperature for a long time to finally make the tape impractical.

EXAMPLES

The present invention is explained in more detail by referring to the following examples, which are not to be construed as limitative.

In Examples and Comparative Examples, the following materials were used at the respective proportions shown in Tables 1 and 2 to prepare pressure-sensitive adhesive tapes.

<Materials>

Acrylic Polymer A

An acrylic polymer (weight-average molecular weight (Mw)=500,000) was obtained by adding 0.2 part by weight of benzoyl peroxide as a polymerization initiator to 100 parts by weight of a mixture of butyl acrylate (95 wt %) and acrylic acid (5 wt %).

Acrylic Polymer B

An acrylic polymer (weight-average molecular weight (Mw)=500,000) was obtained by adding 0.2 part by weight of benzoyl peroxide as a polymerization initiator to 100 parts by weight of a mixture of 2-ethylhexyl acrylate (95 wt %) and acrylic acid (5 wt %).

Tackifier A

Maleic anhydride-modified aliphatic petroleum resin having an acid value of 18 mg KOH/g and a weight-average molecular weight of 2800 (manufactured by ZEON CORPORATION, trademark: QUINTONE C200L).

Tackifier B

Maleic anhydride-modified aliphatic/aromatic copolymerized petroleum resin having an acid value of 18 mg KOH/g and a weight-average molecular weight of 2800 (manufactured by ZEON CORPORATION, trademark: QUINTONE D200).

Tackifier C

Pentaerythritol compound of polymerized rosin having an acid value of 13 mg KOH/g and a weight-average molecular weight of 3100 (manufactured by ARAKAWA CHEMICAL INDUSTRIES, LTD., trademark: PENSEL D-125).

Tackifier D

Maleic anhydride-modified aliphatic petroleum resin having an acid value of 2 mg KOH/g and a weight-average molecular weight of 2800 (manufactured by ZEON CORPORATION, trademark: QUINTONE C200S).

Crosslinking Agent

Trimethylolpropane-modified tolylenediisocyanate (manufactured by NIPPON POLYURETHANE INDUSTRIES CO., LTD., trademark: CORONATE L).

Substrate A

A film formed from low density polyethylene (manufactured by Sumitomo Chemical Co., Ltd., trademark: SUMIKATHENE G201, density 0.919 g/cm$^3$, MFR 2.0 g/10 min).

Substrate B

A film formed from a mixture of 50 wt % of low density polyethylene (manufactured by Sumitomo Chemical Co., Ltd., trademark: SUMIKATHENE G201, density 0.919 g/cm$^3$, MFR 2.0 g/10 min) and 50 wt % of ethylene-vinyl acetate copolymer (manufactured by Mitsui-DuPont Polychemicals Co., Ltd., trademark: Evaflex P-2505, vinyl acetate content 25 wt %, MFR 2.0 g/10 min).

Substrate C

A film formed from a mixture of 100 parts by weight of low density polyethylene (manufactured by Sumitomo Chemical Co., Ltd., trademark: SUMIKATHENE G201, density 0.919 g/cm$^3$, MFR 2.0 g/10 min) and 100 parts by weight of magnesium hydroxide (manufactured by KYOWA CHEMICAL INDUSTRY CO., LTD., trademark: KISUMA 5A).

Substrate D

A film formed from a mixture of 100 parts by weight of a mixture consisting of 50 wt % of low density polyethylene (manufactured by Sumitomo Chemical Co., Ltd., trademark: SUMIKATHENE G201, density 0.919 g/cm$^3$, MFR 2.0 g/10 min) and 50 wt % of ethylene-vinyl acetate copolymer (manufactured by Mitsui-DuPont Polychemicals Co., Ltd., trademark: Evaflex P-2505, vinyl acetate content 25 wt %, MFR 2.0 g/10 min), and 100 parts by weight of magnesium hydroxide (manufactured by KYOWA CHEMICAL INDUSTRY CO., LTD., trademark: KISUMA 5A).

Examples 1-6 and Comparative Examples 1-6

<Preparation of Substrate and Pressure-Sensitive Adhesive Tape>

The materials necessary for each substrate were dry-blended and kneaded in a banbury mixer at 180° C. for 5 min and the obtained mixture was pelletized. The pellets were formed by a T-die extruder (manufactured by THERMOPLASTICS CO., LTD.) to give a film having a width of 150 mm, and a thickness of 0.2 mm and used as a substrate.

One surface of the substrate was subjected to corona discharge treatment to the extent that an anchor effect on the pressure-sensitive adhesive is afforded, and then the above-mentioned acrylic pressure-sensitive adhesive composition (solid content 30%) of a solution type using ethyl acetate as a solvent was directly applied to the substrate by the roll coater method. By drying at a drying temperature of 90° C. for 2 mm, a pressure-sensitive adhesive tape having an adhesive thickness of 30 μm was prepared. The thickness of the pressure-sensitive adhesive tape was about 230 μm. The obtained pressure-sensitive adhesive tape was measured for the adhesive strength to the backside at the initial and after heating.

<Measurement of Adhesive Strength to Backside>

The respective pressure-sensitive adhesive tapes (Examples 1-6 and Comparative Examples 1-6) cut out in the size of 25 mm×100 mm were press-adhered by one reciprocation of a 2 kg roller on the backside thereof (substrate surface free of the pressure-sensitive adhesive), and after standing at 23° C. for 20 min, the adhesive strength necessary for peeling the tape was measured.

The measurement conditions were: 180-degree peeling, tensile speed 300 mm/min, 23° C. and 50% RH atmosphere.

The mixing ratios for the pressure-sensitive adhesive tapes in respective Examples and Comparative Examples and the measurement results of the adhesive strength to the backside are as shown in Tables 1 and 2.

TABLE 1

|  | Examples | | | | | |
|---|---|---|---|---|---|---|
|  | Ex. 1 | Ex. 2 | Ex. 3 | Ex. 4 | Ex. 5 | Ex. 6 |
| Acrylic polymer A* | 100 | 100 | 100 | 100 |  | 100 |
| Acrylic polymer B* |  |  |  |  | 100 |  |
| Tackifier A* | 30 | 30 | 30 | 30 | 30 |  |
| Tackifier B* |  |  |  |  |  | 30 |
| Tackifier C |  |  |  |  |  |  |
| Tackifier D |  |  |  |  |  |  |
| Crosslinking agent* | 2 | 2 | 2 | 2 | 2 | 2 |
| Substrate | A | B | C | D | D | D |
| Adhesive strength to backside | | | | | | |
| Initial (N/25 mm) | 10.6 | 8.3 | 9.5 | 6.7 | 7.2 | 7.1 |
| After heating (N/25 mm) | 10.8 | 8.1 | 9.5 | 7.0 | 7.0 | 7.0 |

(*unit = parts by weight)

TABLE 2

|  | Comparative Examples | | | | | |
|---|---|---|---|---|---|---|
|  | Comp. Ex. 1 | Comp. Ex. 2 | Comp. Ex. 3 | Comp. Ex. 4 | Comp. Ex. 5 | Comp. Ex. 6 |
| Acrylic polymer A* | 100 | 100 | 100 | 100 |  |  |
| Acrylic polymer B* |  |  |  |  | 100 | 100 |
| Tackifier A* | 3 | 100 |  |  |  |  |
| Tackifier B |  |  |  |  |  |  |
| Tackifier C* |  |  | 30 |  | 30 |  |
| Tackifier D* |  |  |  | 30 |  | 30 |
| Crosslinking agent* | 2 | 2 | 2 | 2 | 2 | 2 |
| Substrate | D | D | D | D | C | D |
| Adhesive strength to backside | | | | | | |
| Initial (N/25 mm) | 3.8 | cohesive failure | 8.2 | 5.6 | 9.1 | 5.8 |
| After heating (N/25 mm) | 3.7 | cohesive failure | 3.7 | 3.5 | 5.8 | 3.6 |

(*unit = parts by weight)

In the Tables, the mixing ratios of the materials are in parts by weight. The "initial" in the measurement of the adhesive strength to the backside is the value obtained by evaluation of the pressure-sensitive adhesive tape after treatment of the tape at 50° C. for 24 hr after production of the tape, and "after heating" is the value obtained by evaluation after treatment at 50° C. for 24 hr, heating and preservation at 65° C. for 240 hr and cooling to 23° C.

Examples 7-14 and Comparative Examples 7-13

<Preparation of Substrate and Pressure-Sensitive Adhesive Tape>

The materials necessary for each substrate were dry-blended and kneaded in a pressurized kneader, and the obtained mixture was pelletized. The pellets were formed by a T-die extruder into a film having a thickness of 0.15 mm and used as a substrate.

One surface of the substrate was subjected to corona discharge treatment, and then an acrylic pressure-sensitive adhesive composition (solid content 30%) of a solution type using ethyl acetate as a solvent was applied to the treated surface of the substrate by the roll coater method. By drying at a drying temperature of 90° C. for 2 mm, a pressure-sensitive adhesive tape having an adhesive thickness of 30 μm was prepared. The tape (length 20 m) was wound around a winding core having an inner diameter of 30 mm, treated at 50° C. for 24 hr, and then cut into a 19 mm width to give a pressure-sensitive adhesive tape product. The respective pressure-sensitive adhesive tapes were evaluated for "elongation degree upon unwinding" and "peeled end portion (length of peeled end)".

<Evaluation of Elongation Degree upon Unwinding>

Using the apparatus (according to JIS Z 0237) shown in FIG. 1, a winding core for the pressure-sensitive adhesive tape of the present invention (1) is set on a static axis (2), and the tape is wound by a takeup device (takeup roll (5) in FIG. 1) through an unwinding force measurement device (detector (3) in FIG. 1) and a drive roll (4). After a given time of unwinding, the width of the tape under tension (distance in the direction perpendicular to the longitudinal direction of the pressure-sensitive adhesive tape of the present invention) is measured. Then, the elongation degree (%) upon unwinding of the above-mentioned tape is determined from the relationship between the elongation degree (%) and width (mm) of respective pressure-sensitive adhesive tapes, which had been determined in advance.

Measurement atmosphere; temperature 23° C., humidity 50%

Measurement conditions; unwinding rate 30±2 m/min

Unwinding time 10 sec (time up to stabilization of unwinding force)

Object of tape width measurement; distance of tape between static axis and unwinding force detector (about 30 cm)

Meanwhile, the correlation between elongation degree (%) and width (mm) of respective pressure-sensitive adhesive tapes was determined previously by the following method.

The tape is manually unwound and the portion corresponding to three rounds of outermost circumference is discarded. Thereafter, the tape is unwound such that the tape base is unstretched and undeformed, and cut out in 300 mm in the longitudinal direction (when unwinding is not easy, the tape may be cooled and the like to avoid damage to the tape base).

Reference marks (in the direction perpendicular to the longitudinal direction of the pressure-sensitive adhesive tape) are drawn, in the middle of the tape thus cut out, at 100 mm interval (in the longitudinal direction of the pressure-sensitive adhesive tape), and the both ends of the tape are uniformly stretched gently in the longitudinal direction. The distance between the reference marks after application of the tension and the tape width then are measured (measured at temperature 23° C., humidity 50% RH atmosphere). The elongation degree (%) of the tape is calculated according to the above-mentioned formula using the distance between the reference marks before application of the tension and that after application of the tension.

For example, a graph showing the correlation between the tape width (mm) and elongation degree (%) is prepared as shown in FIG. 2, and the elongation degree (%) upon unwinding, which corresponds to the tape width (mm) after unwinding on the above-mentioned apparatus (namely, the tape width under tension as measured in the above), is derived from the graph of FIG. 2.

For example, when the initial tape width of 19.0 mm becomes 16.0 mm after unwinding, the elongation degree upon unwinding of this tape is known to be 50% from the graph of FIG. 2.

<Evaluation of Peeled End Portion (Length of Peeled End)>

A pressure-sensitive adhesive tape was wound 3 rounds around a steel rod having a diameter of 2.0 mm at temperature 23.0° C., humidity 50% atmosphere. The tape end was cut off, and then the new end was manually pressed to achieve adhesion. It was heat treated at 100° C. for 240 hr and the peeled end portion of the tape (length of peeled end of tape) was measured.

The mixing ratios for the pressure-sensitive adhesive tapes in respective Examples and Comparative Examples and the measurement results of the elongation degree and the peeled end portion (length of peeled end) are as shown in Tables 3 and 4, wherein the mixing ratios are in parts by weight.

TABLE 3

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| Acrylic polymer A | 100 | 100 | 100 | 100 |  | 100 | 100 |  |
| Acrylic polymer B |  |  |  |  | 100 |  |  | 100 |
| Tackifier A | 10 | 30 | 40 |  | 30 | 30 | 40 | 60 |
| Tackifier B |  |  |  | 30 |  |  |  |  |
| Crosslinking agent |  | 1.5 | 1.5 | 1.5 | 1.5 | 1.0 | 1.0 | 2.0 |
| Substrate | A | A | B | B | B | C | D | D |
| Properties |  |  |  |  |  |  |  |  |
| Elongation degree (%) | 21.8 | 22.6 | 34.2 | 16.2 | 15.3 | 6.6 | 4.5 | 5.8 |
| Length of peeled end (mm) | 0.8 | 0.0 | 0.2 | 0.0 | 0.1 | 0.2 | 0.1 | 0.9 |

TABLE 4

|  | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|
| Acrylic polymer A | 100 | 100 |  |  | 100 | 100 |  |
| Acrylic polymer B |  |  | 100 | 100 |  |  | 100 |
| Tackifier A | 3 | 3 | 100 |  |  |  |  |
| Tackifier B |  |  |  |  |  |  |  |
| Tackifier C |  |  |  | 40 |  | 60 |  |
| Tackifier D |  |  |  |  | 40 |  | 70 |
| Crosslinking agent |  | 1.5 | 1.5 | 1.0 | 1.0 | 0.5 | 1.0 |
| Substrate | A | A | A | C | C | D | D |
| Properties |  |  |  |  |  |  |  |
| Elongation degree (%) | 1.5 | 0.9 | 9.2 | 1.6 | 1.4 | 1.5 | 1.8 |
| Length of peeled end (mm) | 5.0 | 0.0 | 2.8 | 0.3 | 0.1 | 2.0 | 2.4 |

When the pressure-sensitive adhesive tape obtained in each Example in Table 3 was used for binding, it showed superior performance, displaying a sufficient unwinding force, tight binding of the objects, and absence of end peeling (the peeled end portion). In contrast, the pressure-sensitive adhesive tapes obtained in Comparative Examples in Table 4 showed insufficient performance due to inferior unwinding force, large end peeling and the like.

According to the present invention, an acrylic pressure-sensitive adhesive composition comprising an acrylic polymer and a tackifier obtained by acid modification of a tackifier resin inherently free of an acid component can be provided. The pressure-sensitive adhesive composition is characterized in that it does not substantially contain a halogen atom. According to the present invention, moreover, a pressure-sensitive adhesive tape comprising a substrate made of a film comprising an olefin polymer and/or a thermoplastic resin containing a carbonyl oxygen atom in the molecular skeleton, which is substantially free of a halogen atom, and the acrylic pressure-sensitive adhesive composition applied to at least one surface of the substrate can be provided.

The pressure-sensitive adhesive composition and the pressure-sensitive adhesive tape are substantially free of a halogen atom, and therefore, do not produce toxic gases upon incineration thereof. In addition, they have high adhesive strength (particularly initial adhesive strength) to an adherend having poor polarity, such as olefin polymer and the like, and show a little decrease in the adhesive strength (particularly adhesive strength to the backside of the pressure-sensitive adhesive tape) after heating and preservation. Thus, they can be used for various applications as alternatives to conventional pressure-sensitive adhesive tapes having a substrate made from PVC materials.

Therefore, the acrylic pressure-sensitive adhesive composition and pressure-sensitive adhesive tape of the present invention have extremely high utility and further development of application to an olefin polymer adherend heretofore considered to be poorly adhesive is possible.

The pressure-sensitive adhesive tape of the present invention having certain ranges of elongation degree upon unwinding and the extent of the peeled end portion of the tape presents superior performance as evidenced by sufficient unwinding force when used for binding, and absence of end peeling after winding of the tape and the like. Accordingly, these tapes can be preferably used as an alternative to a pressure-sensitive adhesive tape having a PVC substrate and a pressure-sensitive adhesive tape having a pressure-sensitive adhesive containing a halogen atom, which have been conventionally used widely.

This application is based on patent application Nos. 2002-051840 and 2002-204898 filed in Japan, the contents of which are all hereby incorporated by reference.

What is claimed is:

1. A pressure-sensitive adhesive tape comprising a substrate made of a film comprising an olefin polymer or a thermoplastic resin comprising a carbonyl oxygen atom in the molecular skeleton, and an acrylic pressure-sensitive adhesive composition on at least one surface of the substrate, wherein the substrate and the acrylic pressure-sensitive adhesive composition are substantially free of a halogen atom, and wherein the acrylic pressure-sensitive adhesive composition comprises an acrylic polymer and a tackifier obtained by a process consisting essentially of acid modification of a tackifier resin inherently free of an acid component, wherein the acid modification of the tackifier resin is effected by reaction of the tackifier resin with an acid anhydride group-containing monomer.

2. The tape of claim 1, wherein the substrate is made of a film comprising an olefin polymer.

3. The tape of claim 2, wherein the substrate further comprises a thermoplastic resin comprising a carbonyl oxygen atom in the molecular skeleton.

4. The tape of claim 3, wherein the thermoplastic resin is an olefin polymer comprising a carbonyl oxygen atom in the molecular skeleton.

5. The tape of claim 1, wherein the substrate is a film comprising an inorganic flame retardant in a proportion of 20-200 parts by weight relative to 100 parts by weight of the olefin polymer.

6. The tape of claim 1, wherein the substrate comprises the thermoplastic resin in a proportion of 1-100% of the total amount of the olefin polymer and the thermoplastic resin.

7. The tape of claim 1, which is suitable for binding.

8. The tape of claim 7, wherein the tape has an elongation degree upon unwinding of 2%-60% at an unwinding rate of 30 m/mm, and a peeled end portion of 0-1.0 mm when wound three rounds around a steel rod having a diameter of 2 mm.

9. The tape of claim 1, wherein the tackifier has a weight-average molecular weight (Mw) of 1000-6000, and an acid value of 5-100 mg KOH/g.

10. The tape of claim 1, wherein the tackifier is comprised in a proportion of 5-80 parts by weight relative to 100 parts by weight of the acrylic polymer.

11. The tape of claim 1, wherein the tackifier having an acid value of 5-100 mg KOliIg is comprised in a proportion of 5-80 parts by weight relative to 100 parts by weight of the acrylic polymer.

* * * * *